US 6,646,410 B2

(12) United States Patent
Rich et al.

(10) Patent No.: US 6,646,410 B2
(45) Date of Patent: Nov. 11, 2003

(54) METHOD AND APPARATUS FOR THE IMPROVED CONTROL OF MOTORS AND OF MOTOR-ACTUATED WORK APPARATUS

(75) Inventors: Leonard G. Rich, West Hartford, CT (US); Raymond Phillips, Portland, CT (US)

(73) Assignee: Gerber Scientific Products, Inc., Manchester, CT (US)

( * ) Notice: Subject to any disclaimer, the term of this patent is extended or adjusted under 35 U.S.C. 154(b) by 0 days.

(21) Appl. No.: 10/052,761

(22) Filed: Jan. 18, 2002

(65) Prior Publication Data
US 2002/0093302 A1 Jul. 18, 2002

Related U.S. Application Data

(63) Continuation of application No. 09/549,246, filed on Apr. 14, 2000.
(51) Int. Cl.[7] .............................................. H02P 7/36
(52) U.S. Cl. .................. 318/799; 318/812; 388/806; 388/928; 388/800

(58) Field of Search .................... 318/799, 812; 388/806, 928, 800

(56) References Cited

U.S. PATENT DOCUMENTS 4,305,025 A * 12/1981 Arnold .................... 388/809
5,982,571 A * 11/1999 Calfee et al. .............. 360/70

* cited by examiner

*Primary Examiner*—Karen Masih
(74) *Attorney, Agent, or Firm*—McCormick, Paulding & Huber LLP

(57) ABSTRACT

Disclosed is control circuitry for providing controlling a motor responsive to feedback signals. The control circuit includes a velocity sensor for coupling with the motor for providing a velocity feedback signal responsive to the velocity of the motor, and circuitry for providing a feedback signal responsive to a voltage associated with the motor, such as the back emf of a coil associated with the motor. The control circuitry can be used enhance the Z-axis control of a tool of a work apparatus for performing work operations on a work material, such as a cutting apparatus for cutting a sheet of vinyl having a releasable backing for generating graphic products.

29 Claims, 3 Drawing Sheets

METHOD AND APPARATUS FOR THE IMPROVED CONTROL OF MOTORS AND OF MOTOR-ACTUATED WORK APPARATUS

REFERENCE TO PRIOR APPLICATIONS

This application is a continuation of application Ser. No. 09/549,246 filed on Apr. 14, 2000 and is entitled to the benefit of and incorporates by reference essential subject matter disclosed therein.

BACKGROUND

Known in the art are work apparatus that include motors for facilitating the performance of selected work operations on a work material with a tool. Examples of such work apparatus include, but are not limited to, plotters, printers, cutting apparatus, and machining apparatus. Such work apparatus can include a variety of motors, such as a motor or motors to provide relative movement between the tool and the work material. For example, the work apparatus can include a work head that mounts a "Z axis" motor for moving the tool toward and away from the work material for selectively engaging the work material with the tool. Other motors can be provided for moving the tool or the work material along X and Y axes, which are perpendicular to the Z axis. Provision can also be made for rotational movement about a selected axis or selected axes. The number of motors and movement axes of a particular work apparatus depends on the degrees of freedom of movement between the tool and the workpiece required to perform the desired work operation.

Control of the motors, and hence of the movement of the tool relative to the work material, is important to properly perform the work operations. Undesirable oscillation or other movement is to be avoided. Often, feedback signals are used in a servo loop to control one or more of the motors of the work apparatus. Typically, a position feedback signal is compared to an instruction signal to produce an error signal representative of the difference between the actual and desired positions of the motor or tool. In addition, a velocity sensor can be coupled to the motor to provide a velocity feedback signal responsive to the velocity of the motor. The utility feedback provides a "viscous" damping, akin to the damping provided to a shock absorber in an automobile, to help avoid unwanted movement of the tool.

Unfortunately, the velocity sensor does not always provide a suitable velocity feedback signal to fully compensate for certain undesirable movements or oscillations. In such a case, work operations can be detrimentally affected. For example, consider a cutting apparatus wherein the work material is a sheet material, such as a sheet of vinyl or paper, extending in the X-Y plane and having a thickness along the Z axis. In the sign making industry, such cutting apparatus cut graphic products from a colored vinyl that is releasably secured by adhesive to a backing material. The outline of the graphic product is cut by the tool, and the graphic product, such as the letter "A" shown in FIG. 1, is peeled from the releasable backing and secured, using the adhesive that remains on the vinyl, to a sign board, plate glass window, truck panel, etc., to fabricate all or part of a sign. It is desirable to cleanly cut the outline of the graphic product, preferably by cutting all the way through the vinyl, but not into the backing material. The work head typically includes a low friction linear motor for controlling the tool along the Z axis. The motor is typically operable in a force mode, wherein it is controlled such that the tool engages the work material with a selected force, as well as in a position mode, where it is controlled so as to move the tool to a selected position along the Z axis. Typically the motor includes the velocity sensor described above, and the motor is used in the force mode and instructed to apply a force to the vinyl sufficient to cut through the vinyl and not the backing. Unfortunately, small oscillations of the tool along the Z axis often occur when cutting and translating the tool, and these oscillations cause a stitching effect wherein portions of the vinyl are not cut all the way through. When peeling the vinyl from the releasable backing, the vinyl can tear, ruining the graphic product. These oscillations occur despite the use of the velocity sensor, which does provide adequate control for repositioning the tool.

As another example where control of the tool is important, work operations, such as the aforementioned cutting of vinyl, can involve rapid or repeated engagement and disengagement between the tool and the work material. When cutting the aforementioned graphic product, the tool can bounce when instructed to move to engage the work material, again, despite the use of the aforementioned velocity sensor in a feedback loop. Such bouncing can mar the vinyl, detrimentally affecting or ruining the vinyl.

Although methods and apparatus, such as the use of velocity feedback, are known for enhancing the control of motors, and hence of the relative movement between the tool and workpiece, unfortunately these known methods and apparatus can be undesirably complex, expensive, or, as noted above, can fail to provide adequate control in certain applications for addressing the above problems.

Accordingly, it is an object of the present invention to address one or more of the foregoing disadvantages or drawbacks of the prior art.

SUMMARY OF THE INVENTION

According to one aspect of the invention, the foregoing and other objects are addressed by providing a control circuit for controlling a motor responsive to feed back signals. The control circuit includes a velocity sensor for coupling with the motor for providing a velocity feedback signal responsive to the velocity of the motor, and circuitry for providing a second feedback signal responsive to the back emf of a coil associated with the motor.

In another aspect of the invention, the coil can be a drive coil of the motor, wherein a "drive coil" refers to a coil that produces a magnetic field for moving the motor. In addition, the control circuit can include a filter for filtering the feedback signal. The filter can be a low pass, an all pass, or a high pass filter. The velocity sensor can include an optical encoder including an encoder element that includes a plurality of spaced indicia.

In yet an additional aspect of the invention, there is provided a control system having a motor and controls therefore, the controls including a velocity sensor for feeding back a velocity feedback signal responsive to the velocity of the motor, and further including a second feedback path for feeding back a feedback signal responsive to the back emf of a coil associated with the motor. The motor is controlled responsive to the feedback signal.

In a further aspect of the invention, the invention provides an apparatus for performing work operations with a tool on a work material responsive to an instruction signal and having improved control of the tool. The work apparatus can include a support structure having a support surface for supporting the work material, a work head mechanically coupled to the support structure and for mounting the tool, and at least one motor for moving the tool toward and away from the work material for selectively engaging the work material. The work apparatus can also include control circuitry for providing a control signal to the motor responsive to the instruction signal and selected feedback signals. The circuitry can include a velocity sensor for providing a velocity feedback signal responsive to the velocity of the motor and a summer for combining the velocity feedback signal with the instruction signal and with a feedback signal responsive to a voltage associated with the motor to provide the control signal.

The invention also include methods practiced in accordance with the teachings herein.

BRIEF DESCRIPTION OF THE DRAWINGS

Other features and objects of the invention will be apparent from the following Detailed Description, in which.

DETAILED DESCRIPTION OF THE PREFERRED EMBODIMENTS

Figure 1:
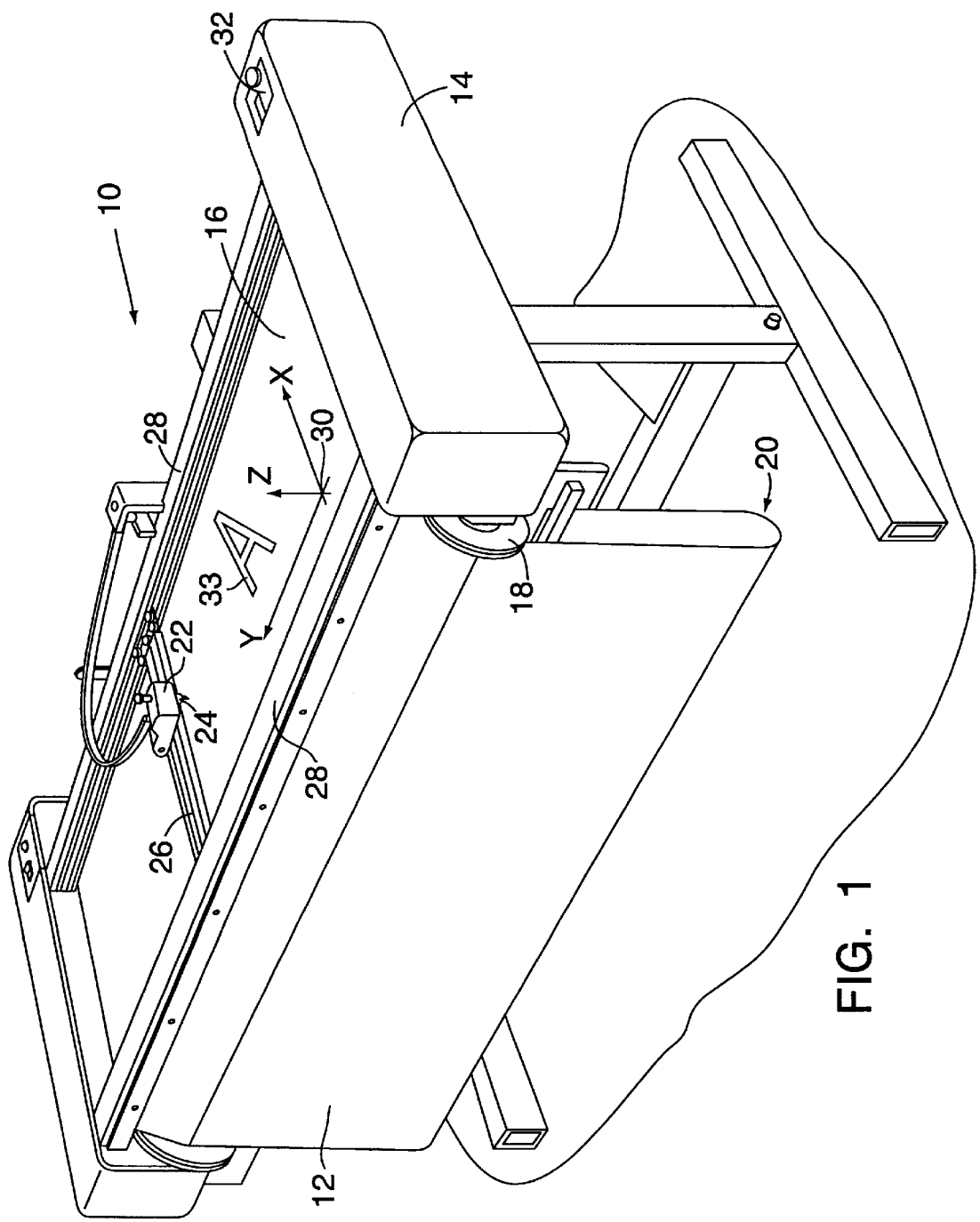
FIG. 1 is a perspective view of a work apparatus for performing work operations with a tool on a work material according to the invention.

FIG. 1 generally illustrates a work apparatus 10 for performing selected work operations on a work material 12. The work apparatus 10, which, for example, can be a printer or a plotter, typically includes a support structure 14 that provides a support surface 16 for supporting the work material 12. The work apparatus 10 also includes a workhead 22 that mounts a tool 24 for performing the work operations on the work material 12. The tool 24 can be a pen, cutting blade, machine tool, sanding blasting tool, laser marker or cutter, or the like. The carriage 26 mechanically couples the workhead 22 to the support structure 14, and is typically mounted with the support structure for translation relative thereto. For example, the carriage 26 can move along tracks 28 for translating the tool along the Y axis and relative to the work material, where reference numeral 30 indicates the X, Y, Z coordinate system. Furthermore, the workhead 22 can be translatable relative to the carriage along the X direction, such that the tool 24 can be moved about the X, Y plane. As is known in the art, suitable motors and mechanical hardware are coupled to the workhead 22, carriage 26, and the tool 24 to provide the desired relative movement between the tool 24 and the work material 12. The work material 12 can also be translated, such as by damps and/or other feed mechanisms, for providing selected relative movement between the tool 24 and the work material 12. In the embodiment shown in FIG. 1, the work material 12 is a sheet material and the support surface 16 is a flat surface for supporting the material. The work material 12 can be wound on the roll 18 so as to form a loop 20 prior to being supported by the support surface 16. However, as is understood by one of ordinary skill in the art, in light of the disclosure herein, apparatus according to the invention can include other than flat support surfaces. For example, the support surface 16 can be a curved surface that includes a cutting strip extending in the direction of the Y axis, or can be the curved surface of a drum. Furthermore, the work material need not be a sheet material, but can take other forms as well.

Typically, the workhead 22 will include a motor (not shown in FIG. 1) for moving the tool 24 toward and away from the work material 12, in the direction of the Z axis, for selectively engaging the work material with the tool.

Typically, a processor associated with the apparatus 10 provides an instruction signal for directing the Z axis movement of the tool 24 and suitable instruction signals to the other motors of the work apparatus 10. The instruction signal can be generated responsive to commands entered via the control panel 32 and/or responsive to programming stored in a memory associated with the processor. In one application, the work apparatus 10 is a cutting apparatus for selectively cutting a graphic product, such as the letter "A" indicated by reference numeral 33 in FIG. 1, from vinyl adhered to a releasable backing material. Such a cutting apparatus is very useful in the sign making industry. In such an application, the tool 24 is a cuffing tool that engages the vinyl with a selected pressure so as to cut through the vinyl but not the releasable backing. The graphic products cut in the vinyl are peeled from the releasable backing and arranged as desired to form a sign, for instance, on a plate glass window. As noted above, it is desirable to cleanly cut the graphic product and, hence, to control the tool 24 to avoid undesirable movements which can detrimentally affect the quality of the graphic product.

Figure 2:
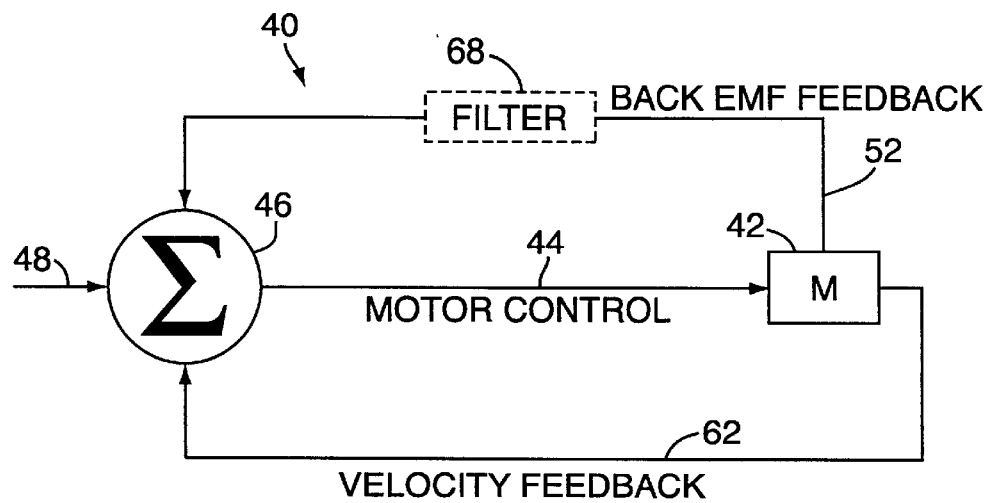
FIG. 2 is a block diagram of circuitry for the improved control of a motor, such as a motor coupled to the tool of the work apparatus of FIG. 1.

With reference to FIG. 2, according to the invention the work apparatus 10 includes circuitry 40 in electrical communication with the motor 42 for providing a control signal 44 to the motor for controlling the motor 42. The summer 46 combines the input instruction signal 48, such as derived from the control panel 32 and/or a processor associated with the work apparatus 10, with a feedback signal 52 responsive to a voltage associated with the motor, and a velocity feedback signal 62 responsive to the velocity of the motor. The combination of the feedback signals of 52 and 62 with the instruction signal 48 can allow control of the tool so as to avoid or lessen unwanted movement of the tool. The feedback signal 52 can be responsive to the back emf of the motor 42 at the terminal of a drive coil of the motor energized by the control signal 44. Optionally, the feedback signal 52 can be conditioned, such as by the filter 68, which can be a low pass, high pass, or all pass filter, and in one preferred embodiment is a high pass filter.

Figure 3:
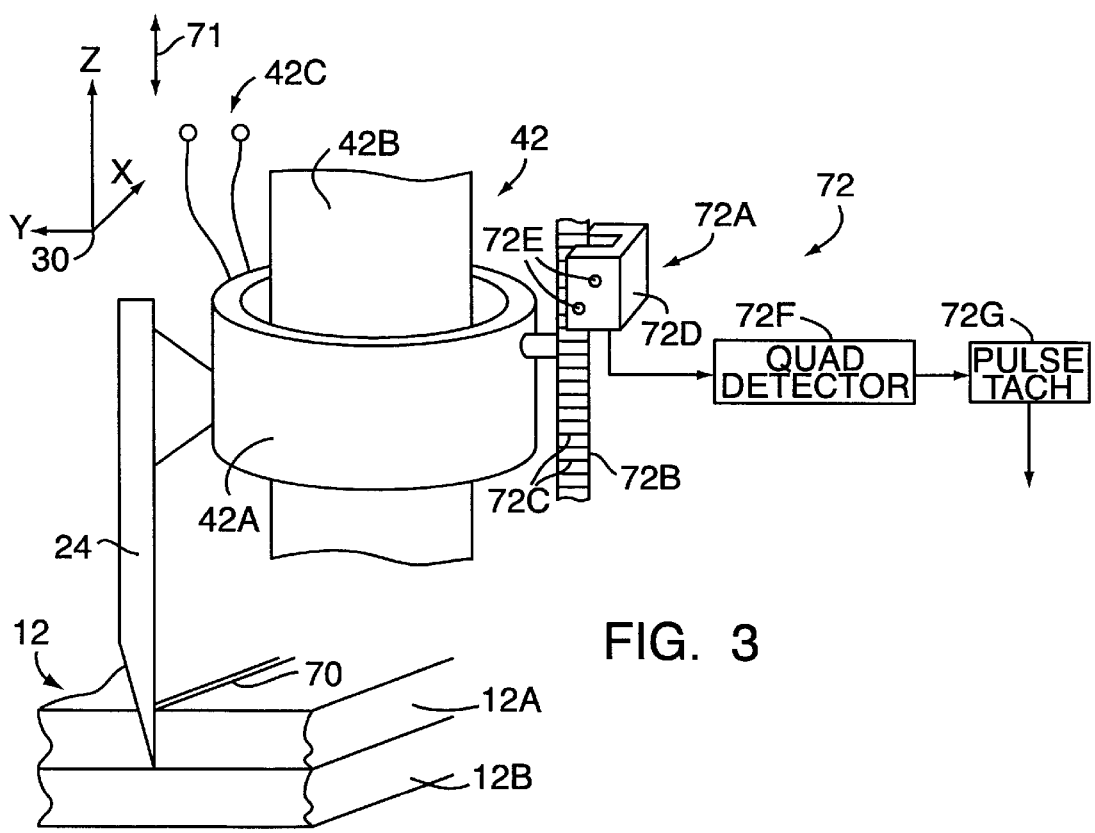
FIG. 3 illustrates one example of a motor often used for the Z axis control of the tool of the work apparatus of FIG. 1 and that can be advantageously controlled using the circuitry shown in the block diagram of FIG. 2.

FIG. 3 illustrates a linear motor 42 having a movable voice coil 42A disposed about a magnetic core 42B. The motor 42 shown in FIG. 3 is often used to control the z axis movement of the tool 24 of work apparatus 10 for cutting graphic products from a work material. The coil material 12 in this instance includes a sheet of vinyl 12A releasably adhered to a sheet of backing material 12B, where numeral 70 indicates the desired cut in the vinyl 12A. It is important in such an application to cut the vinyl 12A without substantially penetrating the backing 12B. The tool 24 is coupled to the voice coil 42A such that when the voice coil 42A is moved up and down, as indicated by reference numeral 71, the tool 24 is moved toward and away from the working material 12 for selectively engaging the working material 12. Responsive to energization of the voice coil 42A via the terminals 42C, the voice coil 42A produces a magnetic field that, in reaction to the magnetic field produced by the magnetic core 42B, causes the movement of the voice coil 42A. The motor 42 shown in FIG. 3 typically provides low frictional resistance to the movement of the plunger 42B.

A velocity sensor can be coupled, such as optically or mechanically, to the motor 42 for facilitating the provision of the velocity feedback signal 62 responsive to the velocity of the motor 42. In FIG. 3, the velocity sensor includes an optical encoder 72A that includes an encoder element 72B coupled to the voice coil 42A and having a plurality of spaced indicia 72C, such as markings or holes. The optical encoder body 72D includes light transmitters 72E and light receivers (not shown) for detecting the movement of the spaced indicia, and well as the direction of the movement of the indicia 72C. The velocity sensor can include a quadrature detector 72F pulse for further processing signals from the optical encoder 72A.

The velocity sensor 72 shown in FIG. 3 is relatively simple, robust and inexpensive. However, in some circumstances the velocity sensor 72 may not provide adequate feedback to control undesirable movements of the motor and tool 24, such as can be induced in the tool 72 when cutting the work material 12 and translating the tool in the x-y plane. Also, when the motor 42 is the linear motor shown in FIGURE, there is typically little internal friction in the motor to help damp undesirable oscillations or movements.

According to the invention, the feedback signal 52 is provided for damping the unwanted movements of the tool 24. The feedback signal 52 can be provided at frequencies other than those within a selected range over which the velocity sensor is responsive, or at frequencies other than those within the normal range or frequencies of movement that the motor is instructed to make. In addition, it can be advantageous to attenuate the feedback signal 52, such as by filtering the signal, at selected frequencies, such as frequencies within the normal range or the selected range, so as to not interfere with the desired movement of the tool. Accordingly, the filter 68 can be included and be adapted to provide a high pass filter function such that desired movement of the tool 24, such as the re-positioning of the tool 24 to cut a different graphic product, which typically occurs at lower frequencies, is not hindered. Alternatively, it may be desirable for the filter 68 to provide a low pass or an all pass filter function.

Figure 4:
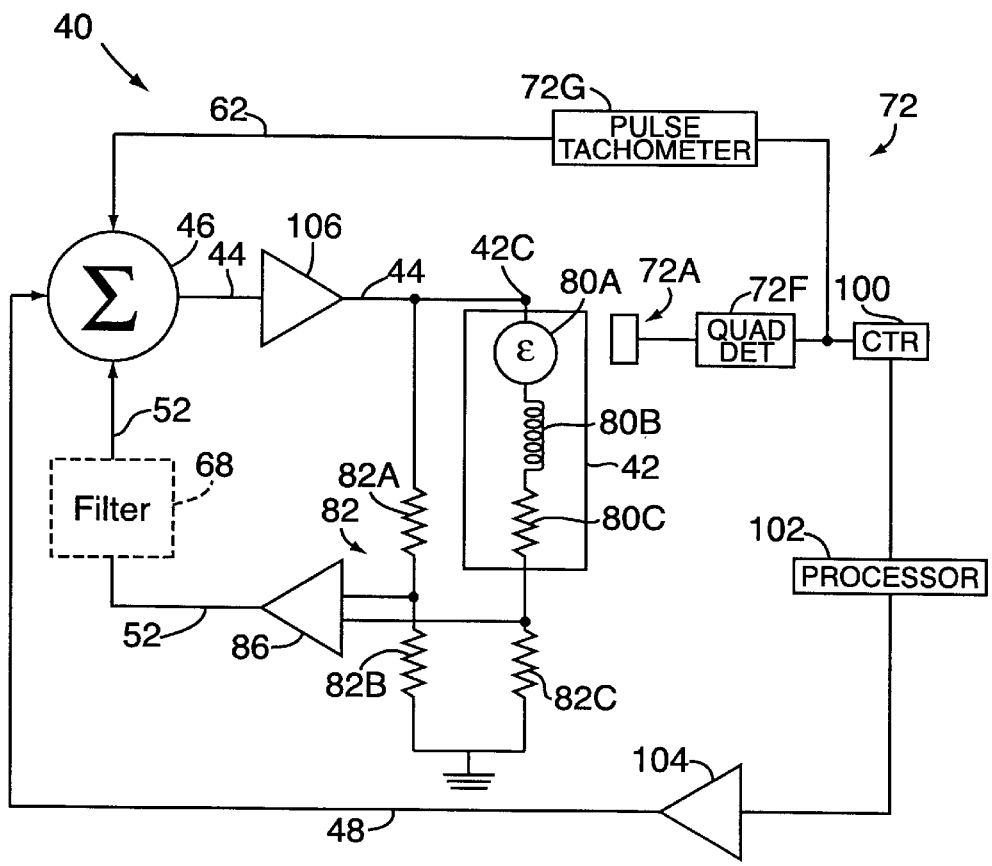
FIG. 4 is an electrical schematic of circuitry corresponding to the block diagram shown in FIG. 3.

FIG. 4 is an electrical schematic of circuitry for providing control of the motor 42 in accordance with the invention, such as is illustrated by the block diagram of FIG. 3. With reference to FIG. 4, the motor 42 can be modeled as a generator 80A that corresponds to the back emf generated by the motor 42, an inductance value represented by inductor 80B, and an internal resistance 80C. Preferably, the back emf bridge 82 is included to allow more accurate generation of the feedback signal 52 responsive to the back emf represented by the generator 80A. The ratio of the resistors 82A to 82B is typically selected to be dose or equal to the ratio of the internal resistance 80C to the resistor 82C, and the absolute values of the resistors 82A and 82B selected to be high to minimize power dissipation. The differential amplifier 86, connected across the back emf bridge 82, provides the feedback 52 signal responsive to the back emf of the motor 42, which signal 52 can optionally be selectively attenuated by the filter 68. Note that it is also possible to obtain the feedback signal 52 responsive to the back emf of the motor 42 from the upper terminal 42C of the motor 42 shown in FIG. 4, such that the back emf bridge 82 need not be included. However, the voltage at the upper terminal 42C will typically include voltage drop due to the internal resistance 80C and voltage drop across resistor 82C, which is often included as a current sensing resistor, as noted below.

The velocity sensor 72 can include the optical encoder 72A, a quadrature detector 72F for processing signals from the light receivers of the optical encoder 72A, and a pulse tachometer 72G, which processes the signal from the quadrature detector 72F. The quadrature detector 72F facilitates determination, from the signals received from the optical detector 72A, of which direction, such as up or down, that the motor 42 is moving. The counter 100 counts pulses from the quadrature detector 72F for providing a signal to the processor 102 for the determination of the position of the motor 42 or tool 24. Responsive to the position of the motor 42 or tool 24 relative to a desired position, or to a desired force with which the tool 24 is to engage the work material 12, the processor 102 provides the instruction signal 48, which is converted from digital to analog form by the digital-to-analog converter (DAC) 104.

The summer 46 sums the instruction signal 48, the velocity feedback signal 62 and the feedback signal 52 responsive to the back emf of the motor 42 to provide the control signal 44. The amplifier 106 can be included for amplifying the control signal 44. As is known in the art, the resistor 82C often functions as a current sensing resistor to provide a feedback signal to the amplifier 106 responsive to the current in the motor 42 for linearizing the output of the amplifier 106. Such an arrangement is known in the art and not further described.

The filter 68 can be a passive R-C filter that includes resistors and capacitors having values selected to provide the desired filter function. However, as is appreciated by one of ordinary skill in the art, many other types of filters are known in the art, such as passive inductive filters, active filters, digital filters, etc., and such filters are deemed within the scope of the present invention.

Figure 5:
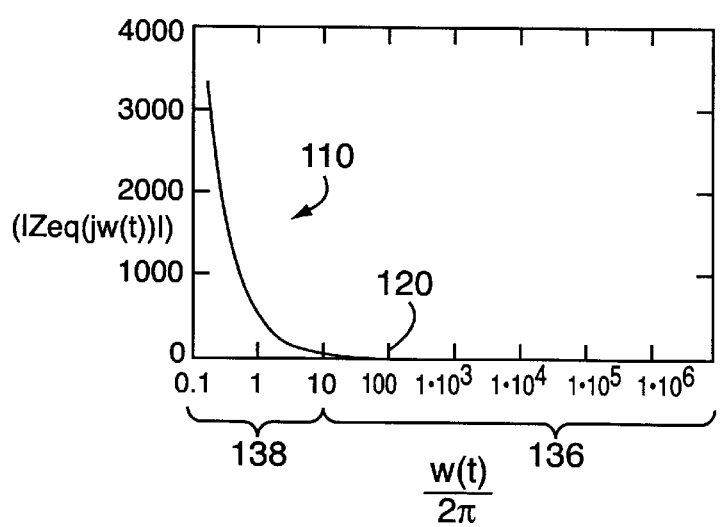
FIG. 5 illustrates one example of a filter function that can be provided by the filter of FIGS. 2 and 4.

FIG. 5 illustrates one filter function 110 found to be useful when using the work apparatus 10 to cut graphic products from a work material such as vinyl. Note that the filter function 110 is a high pass filter function having a low impedance at higher frequencies and having a cut-off frequency of approximately 100 Hz as indicated by reference numeral 120. Thus the undesirable movements of the tool 24 which have been found to occur at frequencies of approximately 100 Hz and higher, as indicated by reference numeral 136, are controlled by the second feedback signal, whereas the effect of the voltage feedback on lower frequency movements of the tool, such as repositioning and calibration, which occur over the normal frequency range of operation of the motor, indicated by reference numeral 138, is reduced.

It is intended that all matter included in the above description, and shown in the accompanying drawings, be interpreted as illustrative and not in a limiting sense. It is understood that one of ordinary skill in the art, in light of the disclosure herein, can envision variations of the embodiments described above without departing from the spirit and scope of the invention. For example, one work apparatus described above is a cutting apparatus for cutting graphic products, wherein the circuitry described above damps oscillations of the motor that controls the Z axis movement of the tool. However, it may be advantageous to practice the invention to damp or control other motors of a cutting apparatus, such the "theta" motor often included for providing rotational movement of the tool 24 about the Z axis, or to damp or control motors of other work apparatus, such as plotting or scribing machines, or even a phonograph, where the movement of the stylus should be properly controlled for accurate sound reproduction.

As noted above, various types of motors are known in the art, and the feedback signals described above can be obtained according to techniques and apparatus other than, or in addition to, those shown in the foregoing FIGURES. For example, known in the art are field-commutated motors that include a number of coils, some of which are selectively energized to provide the desired motion of the motor. The back emf of one or more of the coils associated with the motor, or of another pick up coil associated with the motor, can be used in obtaining the velocity feedback signal. In this instance the velocity sensor 72 can include an appropriate electrical connection to that coil and/or can include processing circuitry, if used, for providing an appropriate velocity feedback signal from the emf of the coil. Similar considerations apply to obtaining a suitable feedback signal response to a voltage associated with the motor.

It is also understood that the following claims are intended to cover generic and specific features of the invention described herein, and all statements of the scope of the invention that as a matter of language might be said to fall therebetween.

Having described the invention, what is claimed as new and to be secured by Letters Patent is:

1. A control circuit for providing feedback for controlling of a motor responsive to feedback signals, comprising:
    a velocity sensor for coupling with the motor for providing a velocity feedback signal responsive to the velocity of the motor to increase damping; and
    means for providing a second feedback signal responsive to the back emf of a coil associated with the motor for additional damping.

2. The control circuit of claim 1 wherein said means for providing a second feedback signal includes a filter for filtering the back emf.

3. The control circuit of claim 2 wherein said filter is a high pass filter.

4. The control circuit of claim 1 wherein the coil is a moveable voice coil of a linear motor.

5. The control circuit of claim 4 wherein said means for providing a second feedback signal includes a filter for filtering the back emf to provide said second feedback signal.

6. The control circuit of claim 1 wherein said velocity sensor includes an optical encoder including an encoder element having a plurality of spaced indicia.

7. The control circuit of claim 1 wherein said velocity sensor is responsive over a selected range of frequencies and wherein said means for providing a second feedback signal provides said second feedback signal over other frequencies different from said selected range of frequencies so as to damp motor movements having a frequency of one of said other frequencies.

8. A control system having a motor and controls therefor, said control system including a velocity sensor for providing velocity feedback signal responsive to the velocity of said motor to increase damping, and wherein said control system includes a feedback path for feeding back to said motor a second feedback signal responsive to the back emf of a coil associated with said motor for additional damping, whereas said motor is controlled responsive to said feedback signals.

9. The control system of claim 8 wherein said feedback path includes a filter for filtering the back emf of said coil.

10. The control system of claim 9 wherein said filter is a high pass filter.

11. The control system of claim 8 wherein said motor is a linear motor having a voice coil, and wherein said coil associated with said motor is said voice coil.

12. The control system of claim 8 wherein said velocity sensor includes an optical encoder including an encoder element having a plurality of spaced indicia.

13. The control system of claim 8 wherein said coil is a movable voice coil of a linear motor, wherein said coil associated with said motor is said voice coil, and wherein said feedback path includes a filter for filtering the back emf of said coil.

14. The control system of claim 8 wherein said velocity sensor is responsive to a selected range of frequencies of motor movement when associated with the motor and wherein said feedback path feeds back said second feedback signal over other frequencies different from the selected range of frequencies.

15. A method for providing enhanced control of a motor, including the steps of:
    monitoring a velocity associated with the motor to generate a first feedback signal to increase damping; and
    monitoring a back emf of a coil associated with the motor to generate an additional feedback signal for additional damping, and adjusting a control signal for the motor responsive to the first and the additional feedback signal.

16. The method of claim 15 wherein providing the additional feedback signal includes filtering the back emf of the coil according to a selected filter function.

17. The method of claim 16 wherein the selected filter function is a high pass filter function.

18. The method of claim 16 wherein the coil associated with the motor is the moveable voice coil of a linear motor.

19. The method of claim 16 wherein providing the first feedback signal includes providing a velocity sensor that includes an optical encoder including an encoding element having a plurality of spaced indicia.

20. The method of claim 16 wherein providing said first feedback signal includes providing said first feedback signal over a selected range of frequencies and wherein providing said additional feedback signal includes providing said additional feedback signal over other frequencies different from said other frequencies so as to damp motor movements having a frequency of one of said other frequencies.

21. An apparatus for performing work operations with a tool on a work material responsive to an instruction signal and having improved control of the tool, comprising:
    a support structure having a support surface for supporting the work material;
    a work head mechanically coupled to the support structure and for mounting the tool;
    at least one motor for moving the tool toward and away from the work material for selectively engaging the work material for performing the work operations thereon; and
    control circuitry for sending a control signal to the motor responsive to the instruction signal and selected feedback signals, said circuitry including a velocity sensor for generating a velocity feedback signal responsive to the velocity of the motor for purposes of damping and a summer for combining the velocity feedback signal with the instruction signal and with a second feedback signal responsive to a voltage associated with the motor to generate the control signal for additional damping, whereby said motor is controlled responsive to said control signal for facilitating the performance of the work operations on the work material.

22. The apparatus of claim 21 including a filter for filtering said second feedback signal according to a selected filter function.

23. The apparatus of claim 22 wherein said selected filter function is a high pass filter function.

24. The apparatus of claim 21 wherein said velocity sensor includes an optical encoder including an encoding element having a plurality of spaced indicia.

25. The apparatus of claim 21 wherein said motor includes a moveable voice coil and wherein said voltage associated with the motor is the back emf of said voice coil.

26. A method of performing work operations with a tool on a work material so as to have improved control of the tool, the method comprising the steps of:

providing a support structure having at least one support surface for supporting the work material;

coupling a work head mechanically to the support structure and mounting the tool thereon;

coupling at least one motor to the tool for moving the tool toward and away from the work material for selectively engaging the work material;

generating an instruction signal representative of the desired movement of the motor;

obtaining a velocity feedback signal responsive to the velocity of the motor obtaining a second feedback signal to increase damping; responsive to a voltage associated with the motor to further increase damping;

combining the feedback signals with the instruction signal to provide a control signal; and sending the control signal to the motor, whereby the motor is controlled to facilitate performing the work operations on the work material responsive to the instruction sign.

27. The method of claim 26 wherein the voltage associated with the motor is the back emf of a coil associated with the motor and wherein providing the second feedback signal further includes filtering the back emf.

28. The method of claim 27 wherein filtering the back emf includes filtering the back emf according to a high pass filtering function.

29. The method of claim 26 wherein providing a motor includes providing a motor having a drive coil and wherein providing the second feedback signal responsive to a voltage associated with said motor includes providing the second feedback signal responsive to the back emf of the drive coil.

* * * * *